No. 891,042. PATENTED JUNE 16, 1908.
J. W. CROSBY.
MOLDING MACHINE.
APPLICATION FILED JUNE 10, 1907.
4 SHEETS—SHEET 2.
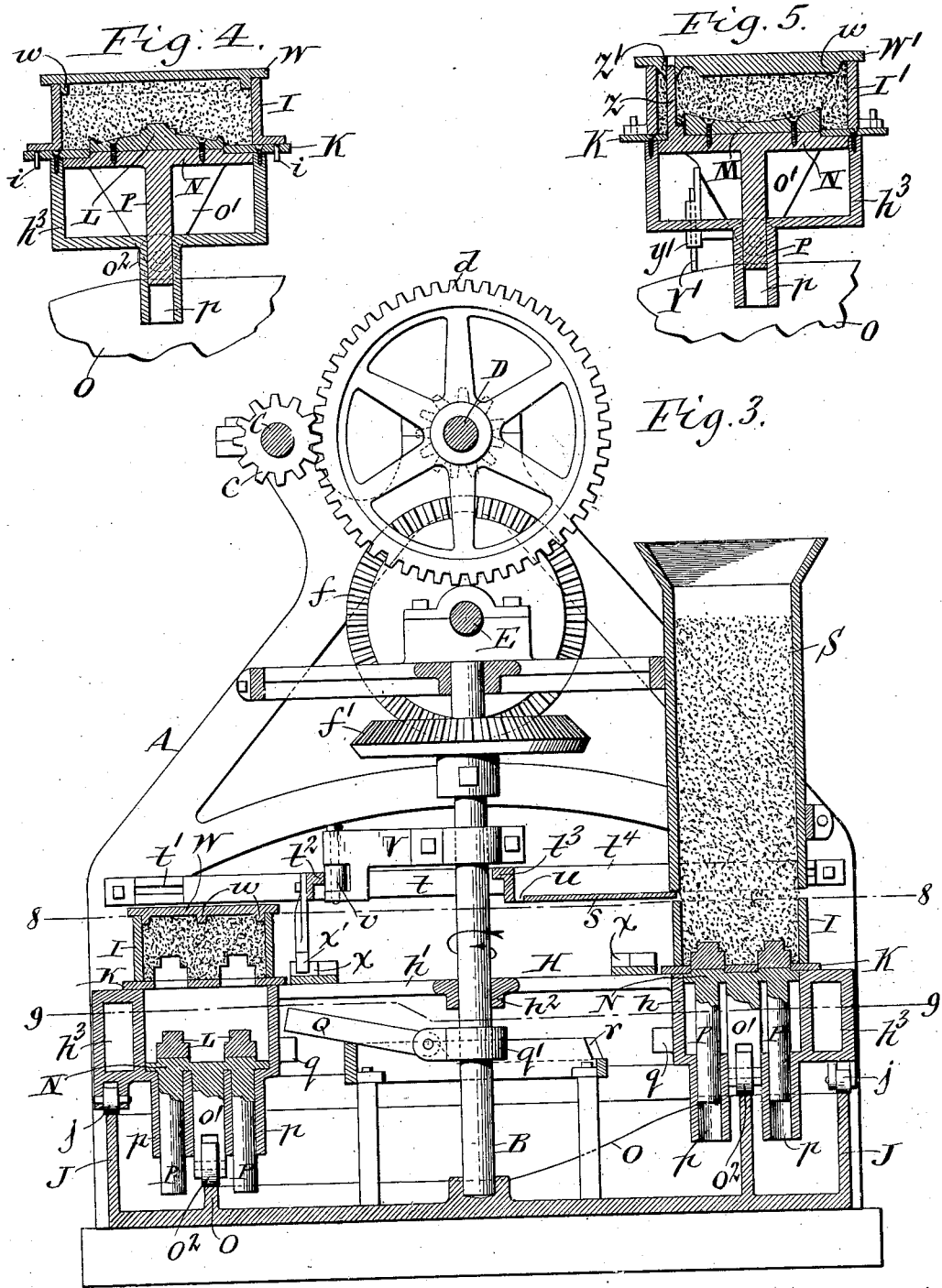

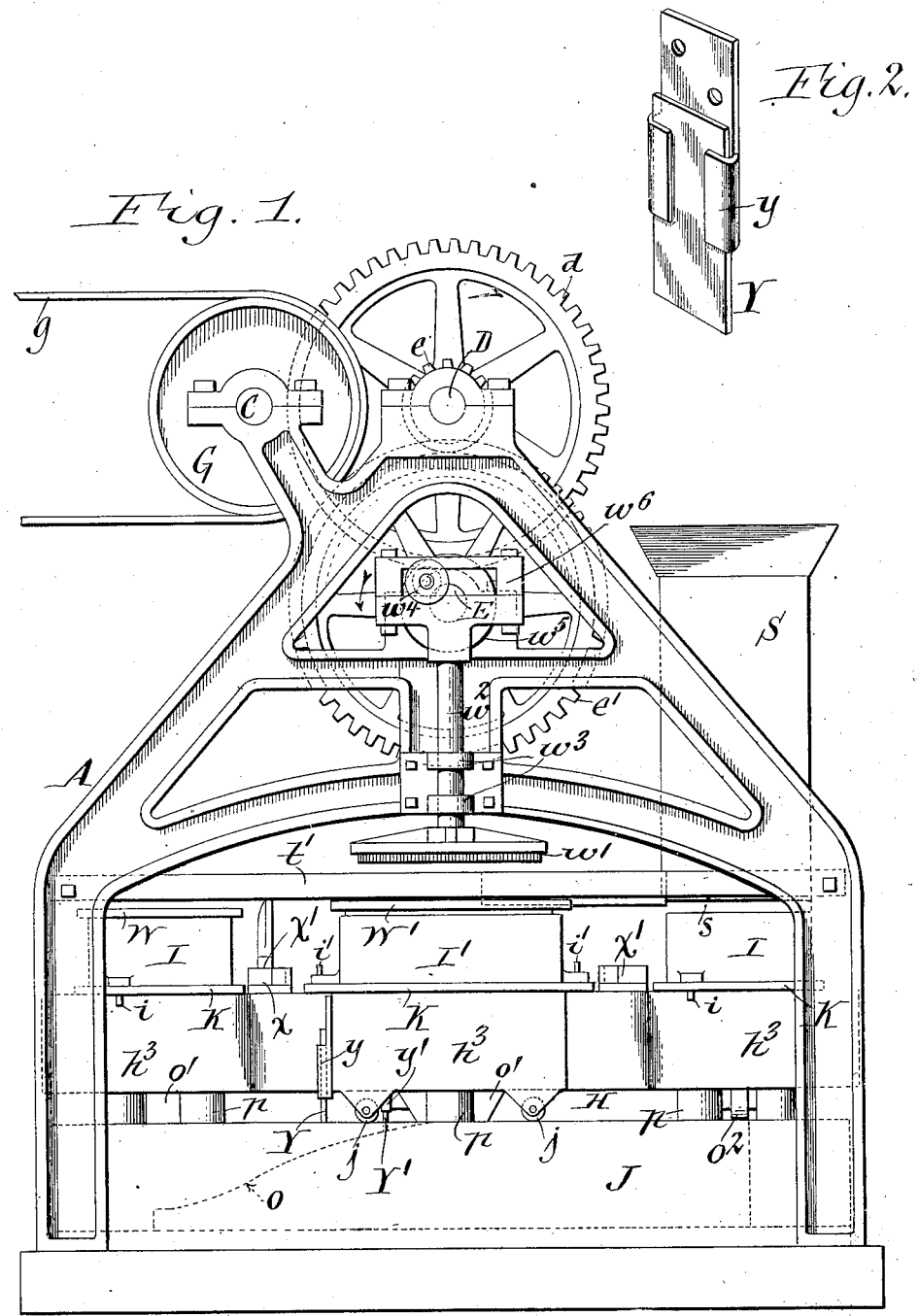

No. 891,042.  
PATENTED JUNE 16, 1908.  
J. W. CROSBY.  
MOLDING MACHINE.  
APPLICATION FILED JUNE 10, 1907.  
4 SHEETS—SHEET 3.
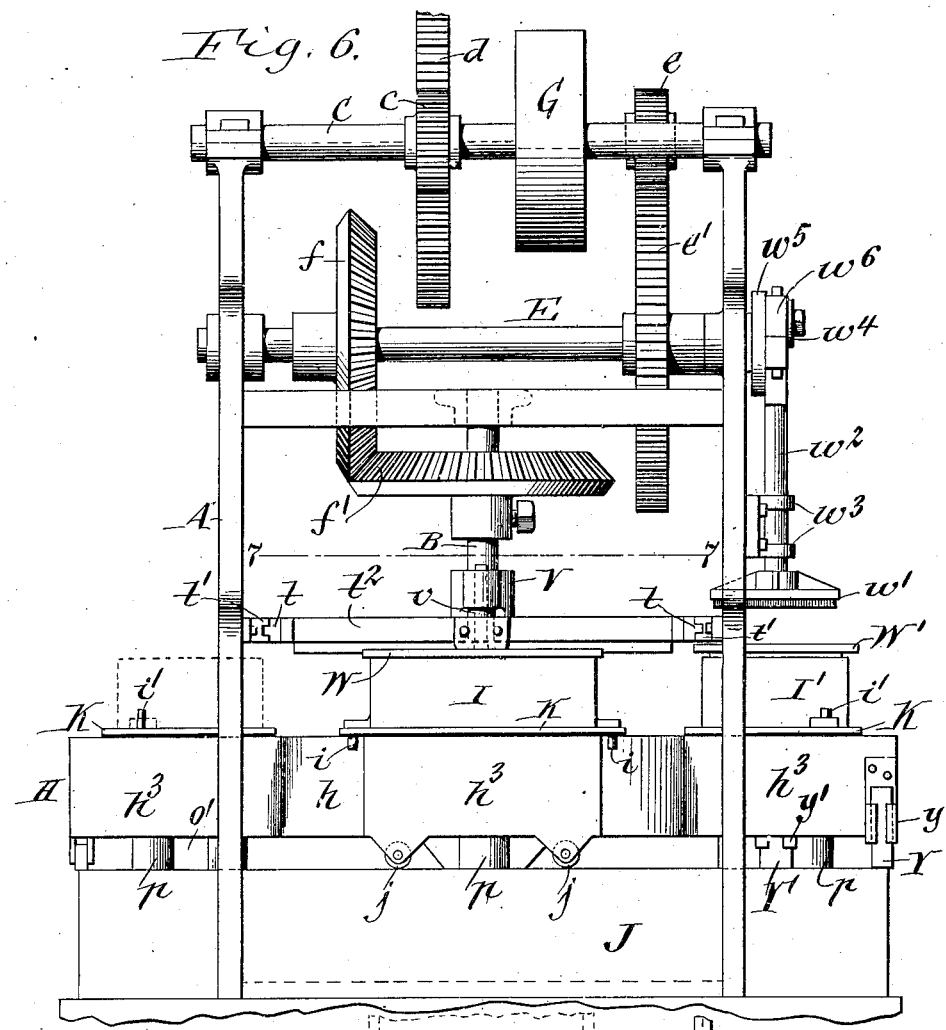
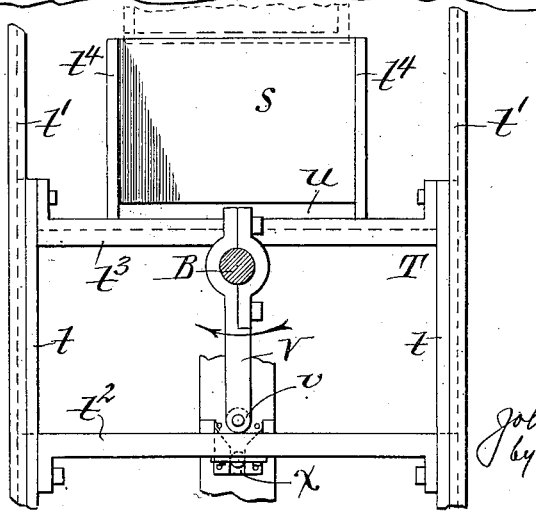

No. 891,042.
PATENTED JUNE 16, 1908.
J. W. CROSBY.
MOLDING MACHINE.
APPLICATION FILED JUNE 10, 1907.
4 SHEETS—SHEET 4.
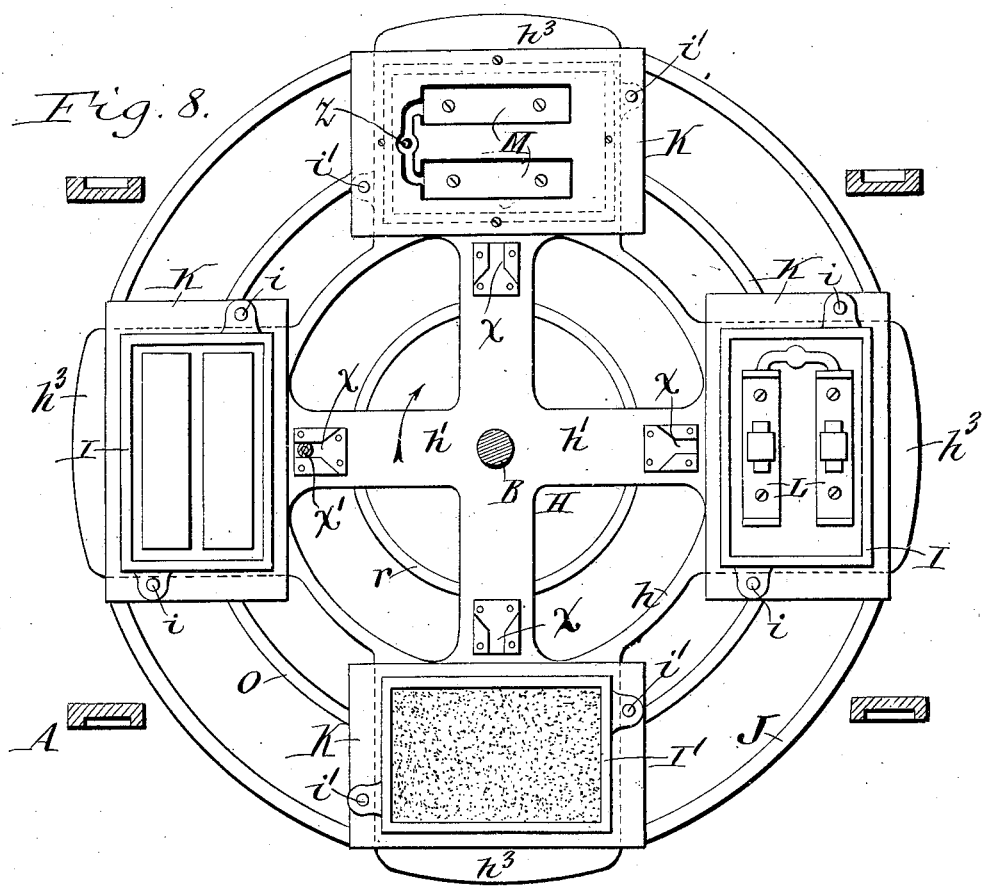
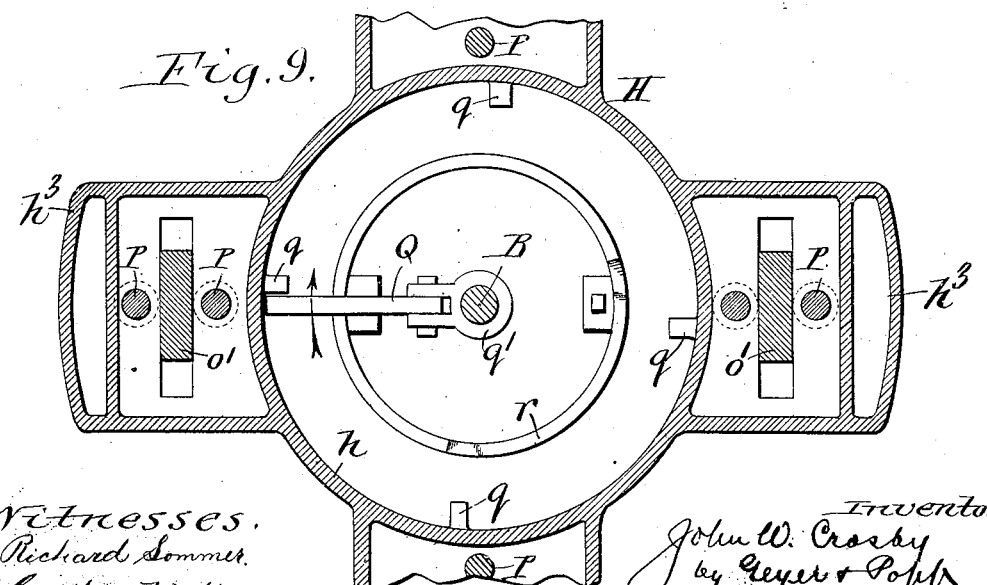

UNITED STATES PATENT OFFICE.

JOHN W. CROSBY, OF BRADFORD, PENNSYLVANIA, ASSIGNOR OF ONE-HALF TO EDMUND R. CALDWELL, OF BRADFORD, PENNSYLVANIA.

MOLDING-MACHINE.

No. 891,042.  Specification of Letters Patent.  Patented June 16, 1908.

Application filed June 10, 1907. Serial No. 378,052.

*To all whom it may concern:*

Be it known that I, JOHN W. CROSBY, a citizen of the United States, and resident of Bradford, in the county of McKean and State of Pennsylvania, have invented a new and useful Improvement in Molding-Machines, of which the following is a specification.

This invention relates to a molding machine for producing automatically and continuously molds in which articles are cast, and has the object to produce a simple and durable machine of this character whereby perfect molds may be produced expeditiously and with a minimum expenditure of power and hand labor.

In the accompanying drawings consisting of 4 sheets: Figure 1 is a side elevation of my improved molding machine. Fig. 2 is a detached perspective view of one of the scrapers or cleaners for removing the molding sand from the tracks on which some of the movable parts of the machine run. Fig. 3 is a vertical longitudinal section of the molding machine. Figs. 4 and 5 are fragmentary vertical sections taken lengthwise through the flask and adjacent parts of the machine and showing different patterns for producing the cope and drag of the mold. Fig. 6 is a fragmentary end elevation of the machine. Fig. 7 is a fragmentary horizontal section taken in line 7—7, Fig. 6. Figs. 8 and 9 are horizontal sections in the correspondingly numbered lines in Fig. 3.

Similar letters of reference indicate corresponding parts throughout the several views.

Although this machine is capable of molding articles of various shapes the same as shown in the drawings is equipped for making molds in which are cast shoes for railway brakes, a complete cycle of molding operations being effected in several successive steps.

In its general organization the machine consists of a plurality of molding devices each consisting essentially of a stripping plate which supports a flask and a pattern movable into and out of the flask, a sand supplying device, a sand pressing device, and a carrier whereby the flask and molding devices are presented successively to said sand supplying and pressing devices. Each cycle of operations preferably comprises four steps during the first of which an empty flask section is placed upon one of the stripping plates, during the second step a charge of molding sand is delivered into the flask section, during the third step the sand in the flask is pressed against the pattern in the same and during the fourth step the pattern is withdrawn from the sand, permitting the attendant to remove the flask section containing the finished mold from the stripping plate and replacing the same by an empty flask section at the beginning of the next cycle of operations.

The main frame A of the machine which supports the different working parts may be of any suitable construction. Arranged in the central part of this frame and journaled in suitable bearings thereon is an upright main shaft B which makes four complete rotations during each complete cycle of molding operations. This shaft rotates continuously and uniformly and may be driven by any suitable means, that shown in the drawings, as an example, and suitable for this purpose consisting of a horizontal driving shaft C journaled in the upper part of the machine, an intermediate shaft D journaled horizontally in the upper part of the machine in rear of the main or driving shaft and operatively connected with the latter by means of a pinion $c$ arranged on the driving shaft and meshing with the gear wheel $d$ on the intermediate shaft, a counter shaft E journaled horizontally in the main frame below the intermediate shaft, a pinion $e$ arranged on the intermediate shaft and meshing with a gear wheel $e^1$ on the counter shaft, and intermeshing beveled gear wheels $f, f^1$ secured respectively to the counter shaft and the upright main shaft, as shown in Figs. 1, 3 and 6. The power may be transmitted to the driving shaft by means of a belt $g$ passing around a pulley G on the driving shaft or by any other suitable or approved means.

Upon the lower part of the main shaft is secured a horizontally rotatable carrier H upon which the flasks or flask sections I, I¹ and the mold forming devices are supported at the periphery thereof. This carrier may be variously constructed but as shown in the drawings the same consists of an annular rim $h$ connected by radial arms $h^1$ with a hub $h^2$ on the main shaft and four hollow arms $h^3$ projecting outwardly equidistant from said rim. To prevent downward deflection of the carrier at its periphery under the weight of the parts resting on the same and the pressure to which it is subjected each of its arms is provided on its underside with rollers $j$ which run on an annular track J which is arranged concentrically with the main shaft. This track is of uniform height throughout.

Upon each of the arms of the carrier is mounted a mold producing device comprising a horizontal stripping plate K which may be secured thereto in any suitable manner and upon each stripping plate is removably placed a flask section in which one part of a mold is to be formed. The stripping plates and the flask sections resting thereon may be held against lateral displacement relatively to each other during the molding operation by various means but preferably by engaging the pins $i$ of the drag sections of the flasks with openings in the corresponding drag stripping plates and providing the cope stripping plates with pins $i^1$ which engage with the perforated ears or lugs on the cope sections of the flasks, as shown in Figs. 4 and 5.

In the construction shown in the drawings, the molding devices on two of the carrier arms are each provided with a double pattern L for producing the drag part of a mold and the other two carrier arms are each provided with a double pattern M for producing the cope part of the mold, these drag and cope forming devices alternating with each other. By this means companion parts of a mold are produced continuously and enable the molding operation to be carried on up to the time of pouring the molds. No incomplete molds are therefore on hand when ready for casting or pouring as would be liable to occur if the machine were organized to first produce a number of copes and then a number of drags. Furthermore, this manner of setting up the machine also avoids the necessity of changing the patterns so long as the same is being used for making molds of the same article.

Within each carrier arm is arranged a vertically movable follower N to the upper side of which is secured the pattern corresponding to the mold section which is to be produced by the respective molding device. As shown in Fig. 4, this pattern L is constructed to form the drag part of a mold while in Fig. 5 the pattern M is constructed to produce the cope part of the mold. In the elevated position of each follower its pattern projects upwardly through an opening in the respective stripping plate and into the flask section resting upon the same, said opening corresponding to the shape of the pattern so as to form a complete closure on the under side of the flask section. The lifting or raising of the followers of the several molding devices is effected by means of a cam shaped track O arranged concentrically with the carrier below its arms and operating upon the followers by means of a shifting arm $o^1$ depending from the central part of each follower and provided at its lower end with a roller $o^2$ which runs on the cam track O. Various means may be provided for guiding the followers during their vertical movement, that shown in the drawings being preferred for this purpose and consisting of two guide rods or stems P depending from each follower on opposite sides of the shifting arm and sliding in vertical guide ways $p$ formed on the lower part of the respective hollow carrier arm. The cam track is so constructed that when a carrier arm reaches the flask receiving position which is indicated at the top of Fig. 8 the follower is lower so that its pattern is lowered or drawn below the stripping plate permitting the latter to be cleaned and the flask section to be applied thereto without interference with the pattern. As the carrier arm moves from the flask receiving position to the sand supplying or filling position indicated at the right of Fig. 8 the follower of the respective carrying arm is raised by the respective portion of the cam track which is suitably inclined for this purpose from its low to its high part, as indicated in Fig. 3, whereby the pattern of the respective follower is projected upwardly through its stripping plate and into the companion flask section. While in this position a charge of molding sand is delivered into the flask and then the carrying arm bearing the filled flask and with its pattern still held in an elevated position is advanced to the pressure position of the machine which is indicated at the bottom of Fig. 8, the respective portion of the cam rail or track over which the roller of the follower runs at this time continuing on the same level. As the carrier arm advances from the pressing position to the flask removing position, indicated at the left of Fig. 8, the roller of the follower runs down an inclined portion of the cam track connecting the high and low portion thereof causing the follower to descend and the pattern to withdraw from the sand in the flask section by gravity. Upon reaching this last mentioned position the flask section containing the finished part of the mold is removed by the attendant and matched with a companion mold section ready for pouring or casting. The respective carrier arm now continues its movement from the flask removing position to the flask receiving position with its follower and pattern in a depressed position inasmuch as the cam track is provided with a low level portion over which the roller of the follower runs at this time.

When the machine is fully under way the four operations of receiving a flask section, delivering sand into a flask section, pressing the sand into a flask section and removing a flask section containing a finished mold are effected simultaneously on different arms of the carrier, these operations progressing with each step in an obvious manner.

At the end of each quarter step of the carrier the same remains at rest an interval of time of sufficient length to permit the flask applying, the sand delivering, sand pressing and flask removing operations to be simultaneously performed. The preferred means for this purpose shown in the drawings consists of four lugs or shoulders $q$ arranged on the inner side of the carrier rim, a vertically swinging coupling pawl or arm Q pivoted at its inner end to a bracket or collar $q^1$ on the main shaft and an annular stationary cam track or rail $r$ adapted to engage and disengage the outer end of said coupling pawl with said lugs. While the flask applying, filling, pressing and removing operations are in progress the coupling pawl Q is lifted above the lugs $q$ and turns with the main shaft and the carrier remains at rest and when the flask applying, filling, pressing and removing operations have been completed the coupling pawl is permitted to drop and engage with one of the coupling lugs so that the carrier is caused to turn with the main shaft. This movement of the carrier continues one step or quarter turn and then the coupling pawl is again disengaged from the respective coupling lug and is held in its inoperative position during the following three quarters of a turn of the main shaft when it is again permitted by the cam track $r$ to engage the next following coupling lug and turn the carrier forward another step or quarter turn. It will thus be noted that by this means the main driving shaft makes one complete rotation for each quarter turn of the carrier and that the latter is moved forward intermittently through the four quarters of a complete turn in effecting a complete cycle of operations of the machine.

Although different means may be employed for delivering the molding sand into the flask sections while at the sand filling position that shown in the drawings is suitable for this purpose and is constructed as follows: S represents a sand delivery hopper or spout arranged with its lower outlet end above the place where the flask sections come to rest for receiving the charge of sand. The discharge of sand from this hopper or spout is controlled by a horizontally movable valve shutter or cut off $s$ of the gate valve type which moves across the lower end of this spout. This valve is mounted on a horizontally reciprocating slide T which consists essentially of two longitudinal side bars $t$ guided in two longitudinal horizontal guide ways or rails $t^1$, $t^1$ secured to the frame, front and rear cross bars or abutments $t^2$, $t^3$ connecting the side bars and two supporting arms $t^4$ projecting rearwardly from the rear cross bar and secured to opposite lateral edges of the gate valve. The rear cross bar $t^3$ of the slide and the adjacent edge of the gate valve are separated by an intervening space or slot $u$ through which any sand lodging on the valve may escape downwardly, thus preventing the spilled sand from accumulating on the valve and interfering with the operation of the machine.

The reciprocating movement of the slide and valve attached thereto is effected by means of a tappet arm V secured to the main shaft and having a tappet or roller $v$ which engages alternately with the front and rear arms of the cross bars of the slide during each rotation of the shaft. In the position of the parts shown in Fig. 3 the tappet engages with the front arm of the slide and the gate valve which is fully withdrawn and the outlet of the sand delivery spout is entirely uncovered, permitting the sand to fall from the spout into the flask section below the same. As the main shaft continues its rotation its tappet $v$ moves idly from the front cross bar to the rear cross bar of the slide and then shifts the slide and the gate valve rearwardly during the last part of its rearward movement so that the gate valve closes the outlet of the sand spout. Immediately after this occurs the coupling pawl Q connects the carrier with the main shaft and advances the carrier one step or quarter turn. During this quarter turn of the carrier the tappet of the main shaft moves idly from the rear cross bar to the front cross bar of the slide and then pushes the latter forwardly for opening the gate valve and permitting a charge of sand to enter the next following empty flask section which is now in the sand receiving position.

Upon reaching the pressing position the operator places a presser board W on the flask section if it contains a drag pattern L and a presser board $W^1$ if it contains a cope pattern. Each of these boards is provided on its underside with suitable ribs or projections $w$ which are adapted to engage with the sand and press the same firmly down upon the pattern in the respective flask section, these ribs varying in their construction and arrangement according to the shape or character of the pattern which is being molded. The presser board is thus pressed with its ribs or projections into the sand of the flask section by means of a vertically movable presser head or platen $w^1$ which is arranged above the point or place where the flask section comes to rest preparatory to being pressed. This platen is secured to the lower end of a vertically movable slide or rod $w^2$ which is guided in a bracket or way $w^3$ on the main frame and is reciprocated by means of a crank pin or wrist $w^4$ arranged on a disk $w^5$ secured to the adjacent end of the counter shaft and working in a slotted yoke $w^6$ secured to the upper end of the platen slide. While the carrier is advancing from one step to another the platen is elevated by its operating mechanism and when the carrier comes to rest at the end of each quarter turn the platen is lowered upon the presser board which has been placed by the attendant on the filled flask and presses this board downwardly upon the sand so as to firmly compact the same around the pattern in the flask section after which the platen again rises preparatory to descending upon the next presser board. In order to center and lock the carrier in its proper position relatively to the sand supplying and pressing devices at the end of each step the upper side of the carrier is provided on its four quarters with sockets $x$ which flare inwardly and the reciprocating slide is provided with a depending centering or locking pin or finger $x^1$ which is adapted to engage successively with these sockets during the last portion of the opening movement of the gate valve. If the carrier should come to rest slightly in advance or in rear of its proper position at the end of the step the locking pin or finger will engage one or the other of the inclined sides at the mouth of the respective socket and turn the carrier into its correct position. In the foremost position of the slide the locking pin engages with the straight portion of the socket and holds the carrier against turning or displacement while the attendants are removing the completed mold, applying an empty flask, and the flask filling and pressing devices are performing their operations.

In order to keep the outer or carrier supporting track clear of sand a scraper or cleaner is provided consisting of a plate Y engaging with the upper side of this track and mounted in a vertical guideway $y$ which is secured to one of the carrier arms. As this plate wears away at its lower end it descends by gravity so as to take up the wear and when fully worn out so that it can no longer be retained by its guide-way the same may readily be replaced by a new plate. A similar scraper $Y^1$ is provided for clearing the upper edge or side of the cam track the same moving in a guide-way $y^1$ which is secured to the shifting arm of one of the followers, as shown in Figs. 5 and 6.

In order to automatically form the sprue hole in the cope part of the mold and the funnel leading to the outer end of this sprue hole, a sprue forming pin $z$ is arranged on each follower which bears a cope pattern and each of the cope presser or top boards is provided with a perforated conical projection $z^1$ which is adapted to receive the upper end of the sprue pin, as shown in Fig. 5. Upon pressing the cope board downwardly in its respective flask section the funnel forming projection receives the upper end of the sprue pin which has been raised together with the cope pattern and upon removing the follower and top board from the flask the sprue opening or hole and the funnel leading to the latter are left in the mold enabling the latter when matched with a companion mold section to be poured without requiring any further attention for this purpose.

I claim as my invention:

1. A molding machine comprising a rotatable carrier adapted to support a molding flask, means for producing a mold in said flask and means for moving the carrier forward intermittently comprising a plurality of lugs or shoulders arranged on said carrier a rotating coupling pawl, and a cam operating to engage said pawl successively with said lugs, substantially as set forth.

2. A molding machine comprising a rotatable carrier adapted to support a plurality of molding flasks, means for producing a mold in each flask mounted on said carrier, and means for rotating said carrier intermittently consisting of a main shaft to which the carrier is secured, a plurality of shoulders or lugs arranged on the carrier, a coupling pawl pivotally supported on the shaft, and an annular cam engaging with said pawl and constructed to permit said pawl to engage with one of said lugs and turn the carrier during a part of each rotation of the shaft, substantially as set forth.

3. A molding machine comprising a rotatable carrier adapted to support a molding flask, a sand supply hopper or spout adapted to deliver sand into the flask, a gate valve for controlling the discharge from the hopper, and means for actuating said valve comprising a sliding frame supporting said valve and having two cross bars or abutments, and a rotatable tappet engaging alternately with said bars or abutments, substantially as set forth.

4. A molding machine comprising a rotatable carrier adapted to support a plurality of molding flasks, a sand supply hopper or spout adapted to deliver sand successively into said flasks, a main shaft arranged concentrically relatively to said carrier, means for rotating said carrier intermittently consisting of a plurality of lugs or abutments arranged on said carrier, a coupling pawl pivotally supported on said shaft and a cam track constructed to permit said pawl to engage with one of said lugs during part of each rotation of the shaft, a gate valve for controlling the discharge of sand from said hopper, and means for operating said valve consisting of a sliding frame supporting said valve and having two cross bars or abutments, and a rotating tappet arm secured to said shaft and engaging alternately with said abutments, substantially as set forth.

5. A molding machine comprising a rotatable carrier adapted to support a plurality of molding flasks, means for delivering sand in the flasks, means for pressing the sand into the flasks, power operated means for rotating the carrier intermittently, and means for holding the carrier against movement at the end of each step consisting of a plurality of sockets arranged in an annular row on the carrier, a locking pin, a sliding frame carrying said locking pin and having two abutments, and a tappet which rotates about the axis of the carrier and which engages alternately with said abutments and moves the locking pin successively into and out of said sockets, substantially as set forth.

Witness my hand this 5th day of June, 1907.

JOHN W. CROSBY.

Witnesses:
 E. R. CALDWELL,
 M. E. GUTHRIE.